United States Patent [19]
Gasaway

[11] Patent Number: 5,871,203
[45] Date of Patent: Feb. 16, 1999

[54] REPLACEABLE SEAL MEMBERS FOR BUTTERFLY VALVE

[75] Inventor: Jerry Gasaway, North Little Rock, Ark.

[73] Assignee: Orbit Valve Company, Little Rock, Ark.

[21] Appl. No.: 879,377

[22] Filed: Jun. 20, 1997

Related U.S. Application Data

[62] Division of Ser. No. 542,435, Oct. 12, 1995, Pat. No. 5,707,040.

[51] Int. Cl.$^6$ .......................................................... F16K 1/22
[52] U.S. Cl. ............................................ 251/306; 251/305
[58] Field of Search ....................................... 251/305, 306

[56] References Cited

U.S. PATENT DOCUMENTS

| | | |
|---|---|---|
| 3,537,683 | 11/1970 | Snell, Jr. . |
| 3,963,213 | 6/1976 | Brattberg ................................. 251/306 |
| 4,254,937 | 3/1981 | Hubertson ............................ 251/306 X |
| 4,281,817 | 8/1981 | Adams et al. . |
| 4,436,281 | 3/1984 | Chiron ................................. 251/306 X |
| 4,601,459 | 7/1986 | Verdelet .................................... 251/306 |
| 4,785,844 | 11/1988 | Pankov . |
| 4,944,489 | 7/1990 | Adams et al. . |
| 5,097,635 | 3/1992 | Beasley . |
| 5,305,787 | 4/1994 | Thygesen . |

OTHER PUBLICATIONS

Vanessa Valve Brochure Publication Date–unknown.

*Primary Examiner*—John Fox
*Attorney, Agent, or Firm*—Hill & Simpson

[57] ABSTRACT

A butterfly valve having a valve body with a seat therein and a valve disc carried on a rotatable shaft such that the valve disc can be moved into and away from sealing engagement with the valve body seat is provided with a removable and replaceable seat member forming the valve body seat and a removable and replaceable sealing surface member is mounted on the valve disc which is sealingly engageable with the seat member when the valve disc is moved into sealing engagement with the valve body seat. The valve body seat preferably is sized to be press fit into a recess in the valve body and retained therein without additional fasteners. This butterfly valve can be used in a single, double or triple offset valve and the valve can be attached to a pipe in any conventional manner. The valve seat material and the sealing surface material may be solid metal, a resistant material such as nylon or Teflon®, may have a metal insert or may have a high temperature insert such as graphite.

17 Claims, 3 Drawing Sheets

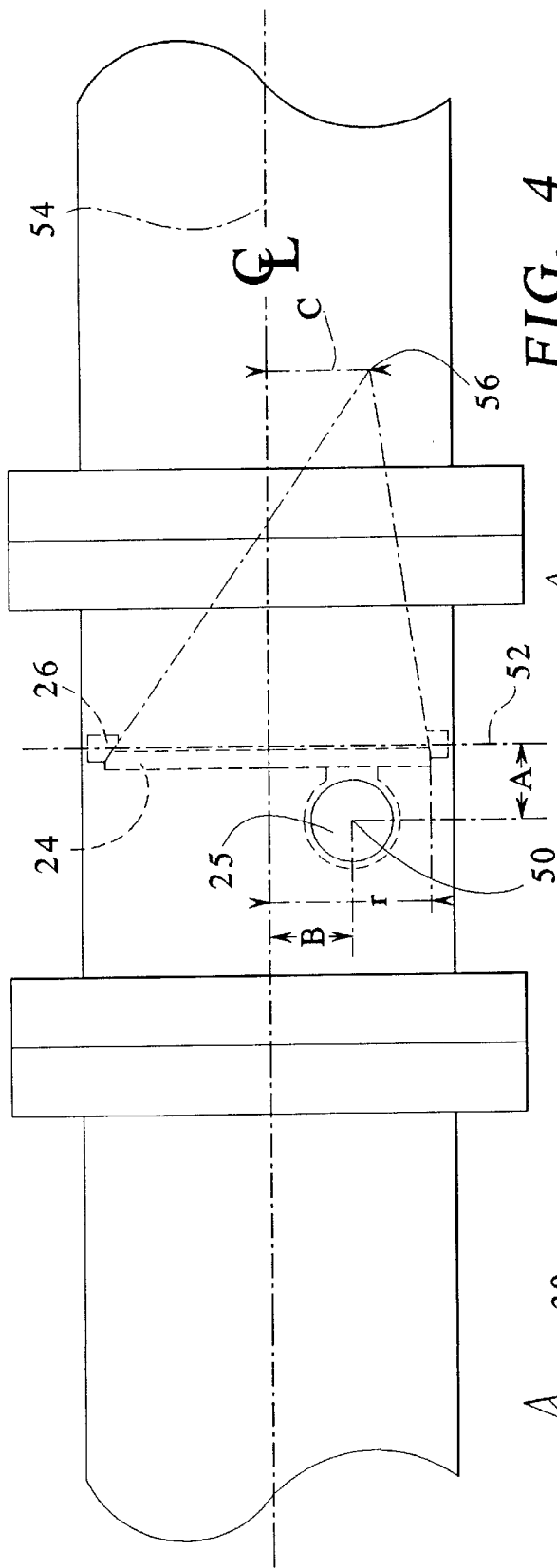
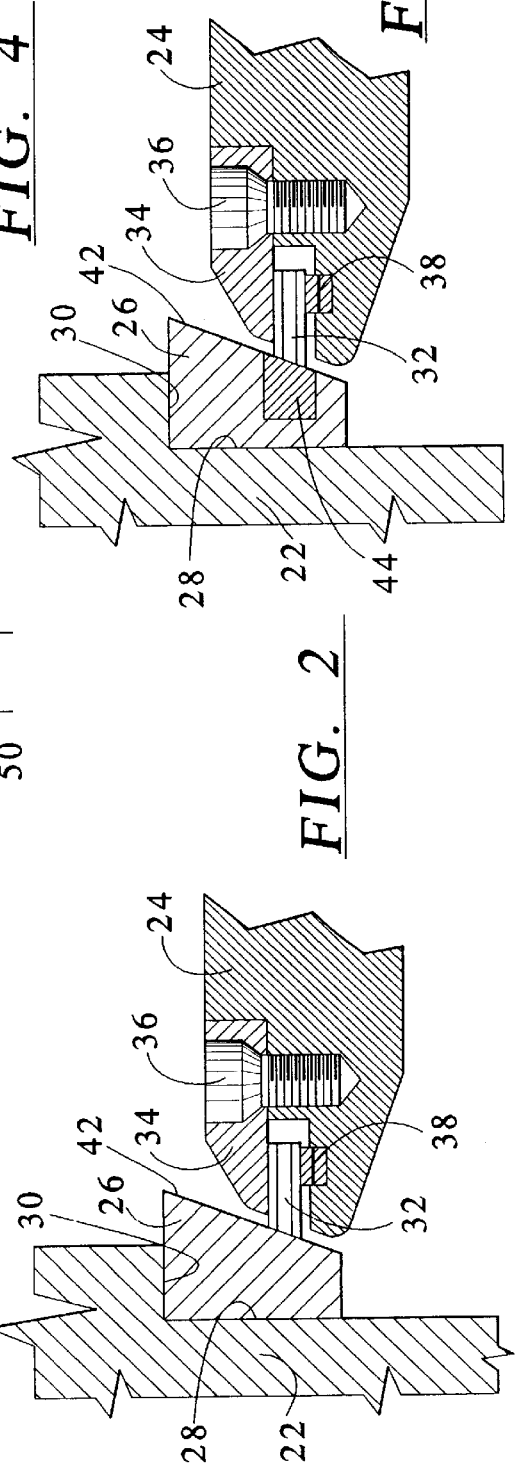
FIG. 2
FIG. 3
FIG. 4

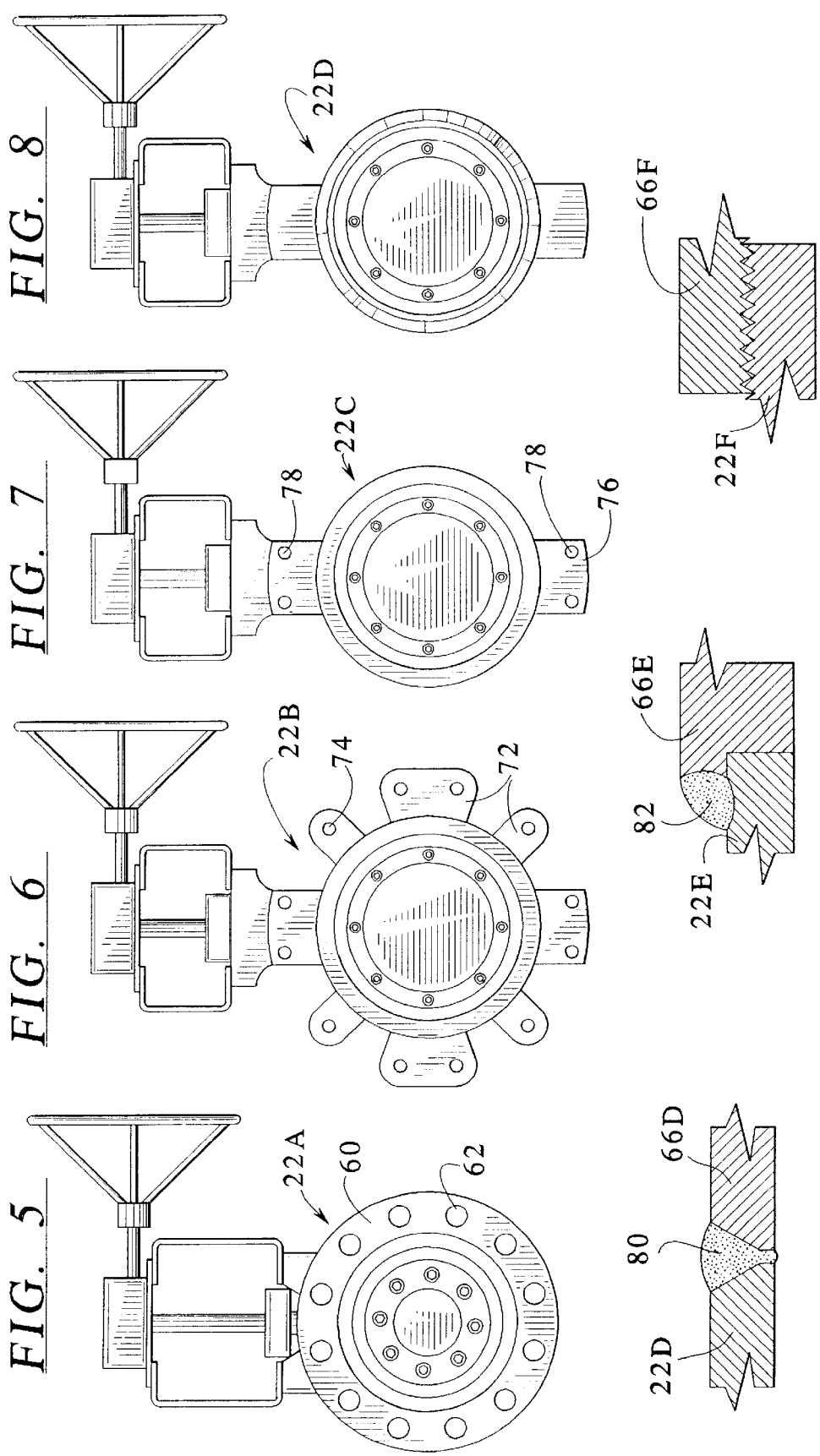

REPLACEABLE SEAL MEMBERS FOR BUTTERFLY VALVE

This is a division, of application Ser. No. 08/542,435, filed Oct. 12, 1995 now U.S. Pat. No. 5,707,040.

BACKGROUND OF THE INVENTION

The present invention relates to sealing members for butterfly valves, and more specifically to removable and replaceable valve sealing members.

Butterfly valves are well known wherein a valve body, which is generally a cylindrical member for allowing fluid to flow therethrough, has a valve seat formed therein and a movable valve disc is carried on a rotatable shaft such that the valve disc can be moved into and away from sealing engagement with the valve body seat. Thus, in such a valve there are two sealing surfaces, one sealing surface is the valve seat in the valve body, while the other sealing surface is carried on a periphery of the valve disc. When the disc is brought into contact with the seat, a seal is formed.

In one type of butterfly valve presently available, the valve seat is formed integrally with the valve body and the sealing member on the valve disc is replaceable and is held onto the valve disc by a retainer ring held in place by cap screws.

In another type of butterfly valve presently available, the valve disc comprises a single unitary member and a removable and replaceable seal member is mounted to the valve body by means of a retaining ring held in place in the valve body by cap screws. In this type of arrangement the cross sectional flow area through the valve body is reduced in order to provide sufficient area for the cap screws to engage into the valve body and for the retaining ring to hold the ring-like seal member in place.

Butterfly valves can be used in a wide variety of installations within a pipeline, wherein the pipeline may carry a wide range of different fluids. In some instances the fluids may be corrosive or may have a relatively high temperature or relatively low temperature, and even might carry some solids. In the operation of a butterfly valve, due to the fluid and material flowing through the valve body when the disc is in an open position, sometimes the sealing surfaces carried by the disc or within the valve body becomes cut, scratched or damaged in some other fashion. When this occurs it is necessary to repair the sealing surfaces in order to be assured that complete sealing will be provided. However, in present constructions it is possible to only replace one of the two sealing surfaces, thus preventing complete repairability of the butterfly valve when both surfaces are damaged.

In order to provide enhanced sealing and reduced wear between the movable disc and the valve body seat, special geometries and constructions are used. For example, in some constructions the valve disc is carried on a shaft and the shaft rotates to move the disc relative to the valve body seat, however, the shaft is offset longitudinally (relative to the fluid flow centerline of the valve body) from the sealing area between the disc and the valve body seat. Thus, an axis of rotation of the disc shaft is parallel to, but offset from, a plane in which the valve disc engages the valve body seat.

A second offset may be provided for the valve disc shaft. This second offset is a lateral offset such that although the axis of rotation of the valve shaft is perpendicular to the flow through centerline of the valve body, the valve disc shaft is laterally offset so that its axis of rotation does not intersect the centerline of the valve body.

Third, it has been found that by making the valve seat have a frusto-conical shape and having the valve disc have a complementary frusto-conical shape enhances the sealing characteristics of the butterfly valve. A third offset is to incline the angle of the frusto-conical shapes such that if the shape was projected out to an apex, the apex would be offset from the centerline of the valve body.

The valve bodies are connected at each end to a pipe forming a pipeline, and the connection can be one of a variety of different connection types. For example, the pipe ends may be flanged and the valve body also flanged with a series of apertures therethrough for receiving mounting bolts to secure the valve body within the pipeline. Alternatively, instead of a full flange, a series of angularly spaced lugs may be provided around the periphery of each end of the valve body to align with similar lugs or a flange on the pipe for receiving securing bolts. Also, the valve body may be a wafer style which is relatively thin and which is positioned between flanges in the pipe and is clamped between the flanges. Further, the valve body may be arranged to be welded to the pipe or even threaded to the pipe.

SUMMARY OF THE INVENTION

The present invention provides for an improved butterfly valve construction wherein the seat in the valve body has a removable and replaceable ring shaped seat seal member and also the valve disc is provided with a removable and replaceable ring shaped sealing surface member such that either sealing member, or both, may be removed and replaced as needed either to repair each of the sealing members due to damage or to allow changing the sealing member materials to suit particular pipeline conditions. Sometimes it becomes apparent after the pipeline has been in service for a while that the seat materials originally selected are not appropriate for the fluid being directed through the pipeline. By use of the present invention, the user may replace both sealing members with a more corrosive resistant material or a sealing member suitable for higher or lower temperature service as is necessary.

The present invention also allows the use of seat materials both in the valve body and on the valve disc that are not weldable type materials or that are not weld compatible with the valve body material. Also, the present invention allows for the use of resilient inserts such as nylon, Teflon®, etc. for solid metal seats and also for seats with metal inserts or high temperature material such as graphite. Thus, the present invention allows for a wide range of flexibility in material selection and replacement and can be used in any type of butterfly valve construction.

BRIEF DESCRIPTION OF THE DRAWINGS

FIG. 2 is a partial side sectional view of the valve seat area of the valve of FIG. 1.

FIG. 3 is a partial side sectional view of the valve seat area as an FIG. 2, showing an optional sealing insert.

FIG. 4 is a plan view of a pipeline with a butterfly valve therein and illustrating three offsets.

FIG. 5 is an end elevational view of a butterfly valve embodying the principles of the present invention utilizing a flanged valve body.

FIG. 6 is an end elevational view of a butterfly valve embodying the principles of the present invention utilizing a lugged valve body.

FIG. 7 is an end elevational view of a butterfly valve embodying the principles of the present invention utilizing a wafer style valve body.

FIG. 8 is an end elevational view of a butterfly valve embodying the principles of the present invention utilizing a weldable or threadable valve body.

FIG. 9 is a partial sectional view of a butt weld connection between a valve body and a pipe.

FIG. 10 is a partial sectional view of a socket weld connection between a valve body and a pipe.

FIG. 11 is a partial sectional view of a threaded connection between a valve body and a pipe.

DETAILED DESCRIPTION OF THE PREFERRED EMBODIMENTS

Figure 1:
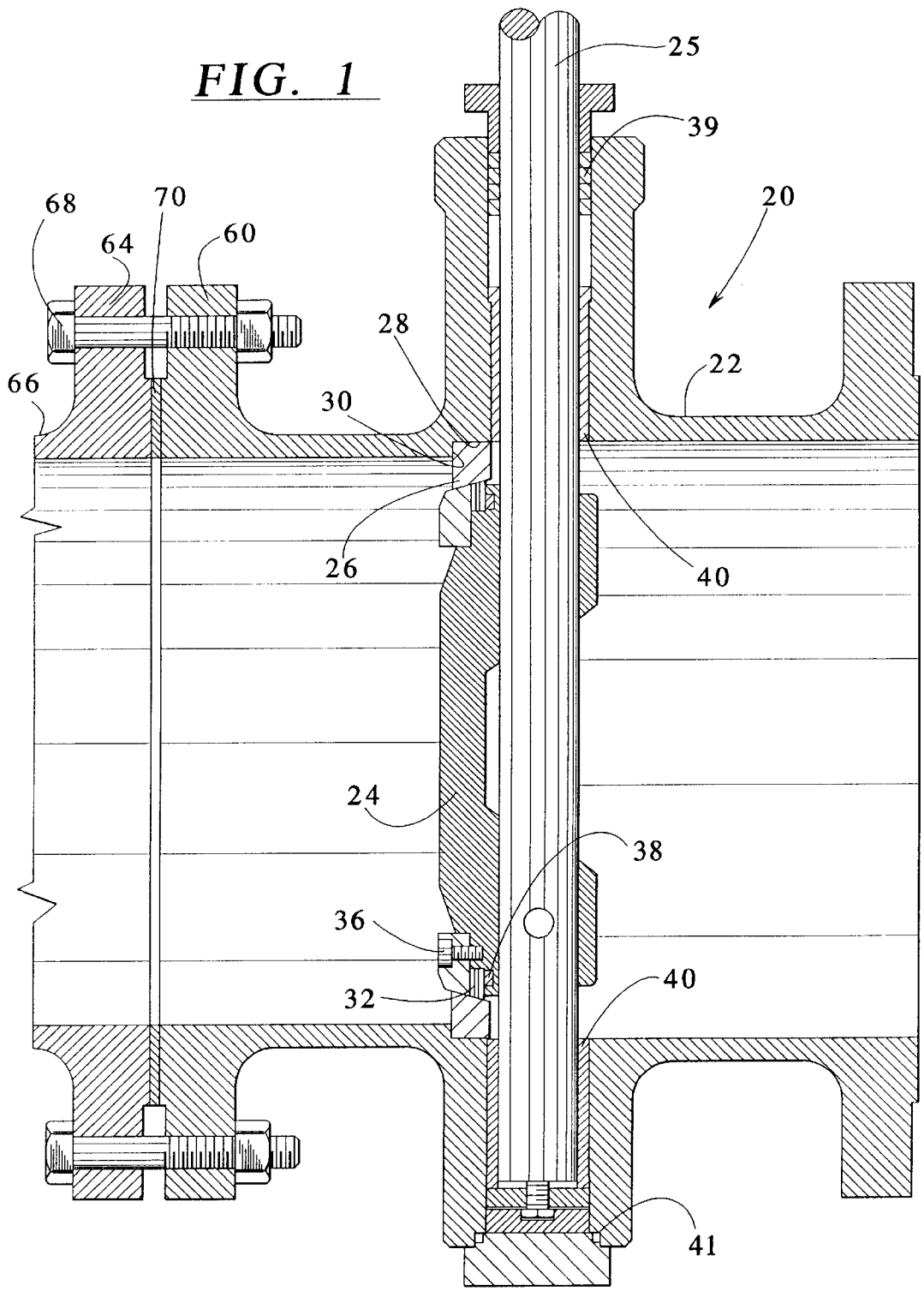
FIG. 1 is a side sectional view of a butterfly valve embodying the principles of the present invention.

In FIG. 1 there is illustrated a butterfly valve generally at 20 which is comprised of a valve body 22 and a movable valve disc 24. The valve disc 24 is carried on a rotatable shaft 25. The valve body 22 is provided with a removable and replaceable seat member 26 which is sized to be press fit into a recess 28 and against a shoulder 30 in the valve body and retained therein without additional fasteners. The seat member 26 preferably is a one piece ring shaped member, although it may have an insert as described in more detail below.

The valve disc 24 is provided with a ring shaped removable and replaceable sealing surface member 32 which is held onto the disc by means of a retaining ring 34 which is secured by cap screws 36 into the valve disc 24. The retaining ring 34 presses the sealing surface member 32 against a gasket 38 so that there is no leakage occurring between the sealing surface member 32 and the disc 24. The valve shaft 25 is journaled in the valve body 22 by use of bushings 40 and sealed by packing 39 and gasket 41 to avoid any leakage at the valve shaft.

As best seen in FIG. 2, typically the seat member 26 has a frusto-conical shape and presents an angled surface 42 facing toward the disk 24. Also, the sealing surface member 32 has a complementary frusto-conical shape such that when the disc 24 is closed into engagement with the valve body 22 the two angled surfaces will wedge together to form a tight seal area.

The seat member 26 and the sealing surface member 32 may be formed from a variety of materials to accommodate particular fluids and temperatures of fluids flowing through the valve body 22, such as a resilient material like synthetic rubber, nylon or Teflon®, or a solid metal material formed of a particular metal which, in some instances, may need to be resistant to corrosive characteristics of the fluid. Also, as shown in FIG. 3, the valve seat member 26 may be provided with an insert 44 such as a resilient material like synthetic rubber, nylon or Teflon® or a high temperature material like graphite or a metal insert retained within a different metal material forming the seat member 26. Thus, a wide range of conditions may be accommodated by selecting the appropriate material for the seat member 26 and the sealing surface member 32. Also, both of these sealing members 26, 32 can be removed and replaced if conditions of the fluid carried through the valve body 22 change or if it is determined after an initial operating period that different materials would be more suitable for use in connection with the fluids being directed through the valve body, in addition to being changed or replaced due to damage to either or both members.

In order to enhance the sealing characteristics of the butterfly valve 20 and to reduce wear and rubbing action between the valve body seat member 26 and the sealing surface member 32, it may be desirable to provide one, two or even three offsets. These offsets are illustrated in FIG. 4.

There it is seen that the valve shaft 25 has an axis of rotation 50 which is offset by a distance A from a plane 52 passing through the sealing engagement area between the valve seat member 26 and the sealing surface member 32. A second offset is shown wherein the axis of rotation 50 is offset laterally by a distance B from a centerline 54 of the valve body such that, although the axis of rotation 50 is perpendicular to the valve body centerline 54, they do not intersect.

A third offset is shown which relates to the frusto-conical shape of the valve seat member 26 wherein, when the conical shape is projected out to an apex 56, that apex is offset by a distance C from the centerline 54 of the valve body 22. The present invention accommodates any one or any combination of these offsets. If the third offset is utilized, then the angle of the inwardly directed face 42 of the valve seat member 26 changes in relation to the sidewall of the valve body 22 around the circumference of the seat member 26. This same changing angle is complemented by the sealing surface member 32. Thus, these two sealing members must be mounted into the valve body 22 and onto the valve disc 24, respectively, in the appropriate angular position so that the two angled mating surfaces will be properly aligned. This angular positioning may be accomplished by means of recesses and detents, markings or other alignment features.

The present invention can be utilized in any style of valve body available. For example, FIG. 5 illustrates a butterfly valve body 22A having a full flange 60 with a series of angularly spaced holes 62 therethrough. As shown in FIG. 1, such an arrangement is provided so that the flange 60 will abut with a flange 64 on a pipe 66. Such flange 64 also is apertured so that a clamping bolt 68 can hold the two flanges together with a sealing gasket 70 interposed therebetween.

FIG. 6 illustrates a somewhat similar valve body 22B which, instead of a full flange, contains a series of angularly spaced lugs 72 which have holes 74 therethrough, again for receiving fastening bolts from a pipe. In this type of arrangement the valve body 22B may have a relatively short axial dimension along its flow centerline 54 such that the lugs 72 are clamped between adjacent end flanges in the connecting pipes.

FIG. 7 illustrates a wafer style valve body 22C in which the axial length of the valve body is short and the valve body is sandwiched between two flanged pipe ends. A single bottom lug 76 is provided and holes 78 are provided at the top and bottom of the valve body 22C for receipt of clamping and aligning bolts from the pipe flanges.

FIG. 8 illustrates a valve body 22D that is designed to be connected to adjacent pipes either by welding or by a threaded connection.

FIG. 9 illustrates a butt weld between a valve body wall 22D and a pipe wall 66D. The ends of the two walls are beveled to receive the weld material 80. A second type of weld connection is illustrated in FIG. 10 which is referred to as a socket weld in which a pipe 22E is received in a socket in a valve body 66E and weld material 82 holds the two walls together.

FIG. 11 illustrates a threaded connection between a valve body wall 66F and a pipe wall 22F.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A butterfly valve having a valve body with a valve seat therein and a valve disc assembly carried on a rotatable shaft such that said valve disc assembly can be moved into and away from a sealing engagement position with said valve seat, said valve body defining a longitudinal centerline:

wherein said valve seat comprises a removable and replaceable seat member; and said valve disc assembly comprises a valve disc and a removable and replaceable sealing surface member mounted on said valve disc which is sealingly engageable with said seat member when said valve disc assembly is moved into said sealing engagement position with said valve seat;

wherein said seat member is formed in a frusto-conical shape on an inside surface thereof and said sealing surface member has a complementary frusto-conical shape, said frusto-conical shape, when projected to an apex, defining an apex point offset from said longitudinal centerline of said valve body and offset by a radial distance from said longitudinal centerline of said valve body less than a largest inside radius of said seat member.

2. A butterfly valve according to claim 1, wherein said seat member is sized to be press fit into a recess in said valve body and retained therein without additional fasteners.

3. A butterfly valve according to claim 1, wherein an axis of rotation of said rotatable shaft is parallel to but offset from a plane in which said valve seat is engaged by said sealing surface member.

4. A butterfly valve according to claim 3, wherein said valve body is cylindrical and has a longitudinal centerline, and said rotatable shaft is perpendicular to and offset from said longitudinal centerline such that an axis of rotation of said shaft does not intersect said longitudinal centerline.

5. A butterfly valve according to claim 1, wherein said valve body comprises a wafer style body.

6. A butterfly valve according to claim 1, wherein said valve body has a plurality of apertured lugs formed thereon to mate with corresponding apertures on a flange of a pipe to be connected to said valve body.

7. A butterfly valve according to claim 1, wherein said valve body has a flange thereon with holes therethrough to mate with a complementarily apertured flange on a pipe to be connected to said valve body.

8. A butterfly valve according to claim 1, wherein said valve body has an end thereon configured to be butt welded to a pipe to be connected to said valve body.

9. A butterfly valve according to claim 1, wherein said valve body has an end thereon configured to be socket welded to a pipe to be connected to said valve body.

10. A butterfly valve according to claim 1, wherein said valve body has a threaded end to mate with a complementarily threaded pipe to be connected to said valve body.

11. A butterfly valve according to claim 1, wherein at least one of said seat member and said sealing surface member comprise a resilient material wherein said resilient material is selected from the group consisting of nylon and Teflon®.

12. A butterfly valve according to claim 1, wherein at least one of said seat member and said sealing surface member comprises solid metal.

13. A butterfly valve according to claim 1, wherein at least one of said seat member and said sealing surface member comprises a metal insert.

14. A butterfly valve according to claim 1, wherein at least one of said seat member and said sealing surface member comprises a high temperature insert consisting of graphite.

15. A butterfly valve according to claim 1, wherein said seat member comprises a resilient insert wherein said resilient insert is a material selected from the group consisting of nylon, rubber and Teflon®.

16. A butterfly valve according to claim 1, wherein said seat member comprises a metal insert.

17. A butterfly valve according to claim 1, wherein said seat member comprises a high temperature insert consisting of graphite.

* * * * *